Dec. 2, 1952  H. P. DE GREEN  2,620,428
PIERCER FOR NIPPLES FOR BOTTLES
Filed Jan. 11, 1950

INVENTOR.
Hyatt P. De Green
BY
Chas J. Hyde
ATTORNEY

Patented Dec. 2, 1952

2,620,428

UNITED STATES PATENT OFFICE 2,620,428

PIERCER FOR NIPPLES FOR BOTTLES

Hyatt P. De Green, East Cleveland, Ohio

Application January 11, 1950, Serial No. 137,951

3 Claims. (Cl. 219—29)

This invention pertains to a device for opening the holes in a nipple for a baby's bottle.

As is well known to persons who have "bottled" a baby, there is a tendency for the small holes in the end of the nipple to clog up, and once clogged it is not easy to open them and still retain a sterile nipple. Sometimes shaking the bottle violently in an upside down position will dislodge the obstruction, but this is apt to splatter milk over a wide area. Of course a new nipple can be put on but this is very inconvenient, especially at two a. m. The tendency is for the person to use his fingers to forcibly squeeze a quantity of milk out of the nipple, thus forcing the hole open. This is unsatisfactory as it renders the nipple unsterile. Some persons heat a pin or needle with a match and then open the holes. This leaves a harmless but disagreeable deposit of carbon on the nipple, and usually the needle or pin has cooled so that it is not effective in opening the holes.

An object of the invention is to provide an inexpensive device for quickly and easily opening the holes in a bottle nipple, either one at a time or all three simultaneously.

A further object of the invention is to provide a device which sterilizes itself as it opens the holes in a bottle nipple.

Another object of the invention is to provide a nipple-piercing device which may easily be taken apart for cleaning.

Still another object of the invention is to provide a "self-centering" opener for the holes in bottle nipples.

For a better understanding of the present invention, together with other and further objects thereof, reference is had to the following description taken in connection with the accompanying drawings, and its scope will be pointed out in the appended claims.

In the drawing, Fig. 1 is a cross-sectional view taken along line 1—1 of Fig. 2, showing the interior construction of the device of this invention;

Figure 2:
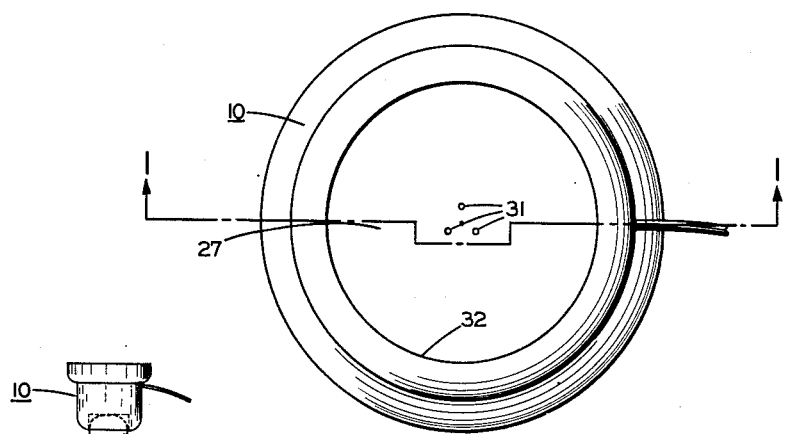
Fig. 2 is a top view looking down on the device shown in Fig. 1.

One aspect of my invention comprises a device for opening the holes in a bottle nipple in which device there is an electrical heating element and a heat collecting member connected to the heating element in heat transfer relationship. A needle-like member is connected to the heat collecting member so that the needle will be heated.

With reference to the drawing, the device for opening holes in nipples comprises a tubular housing 10 preferably formed of hard heat insulating material such as a ceramic. The housing includes as an integral part an inwardly projecting ring 11 forming an upper shoulder 12 and a lower shoulder 13. A disc-shaped electrical heating element 14 having a central opening 15 is positioned within the housing immediately below the shoulder 13. The heating element comprises a resistance wire 16 mounted in a groove in a base member 17 which is electrically non-conductive and which preferably is a poor heat conductor. The resistance wire 16 faces upwardly through the opening which extends the length of the tubular housing 10 and, if desired, a thin layer of perforated mica or the like 20 may be positioned immediately above the resistance wire 16. The layer of mica 20 is positioned just below the lower shoulder 13 of the ring 12 in the housing and the heater element 14 when secured up against the mica layer and the shoulder by means to be described serves to hold the mica layer 20 in place.

Wires 22, 23 extend from the ends of the resistance wire 16 down through passageways 18 in the base member 17 and out through a hole 25 in the side wall of the housing 10 to be connected to an electrical circuit. A switch may be built into the electrical wires within the housing 10, as is well known to the art, or a two-pronged plug may be connected to the end of the wires 22, 23 for plugging into a supply of current, such for example as a supply of 110 volt, 60-cycle per second current.

A disc-shaped heat collecting member 27 is positioned down in the housing 10 with its peripheral edge in engagement with the upper shoulder 12. The heat collecting member 27 has a central threaded opening 28 in its lower portion 29 which extends down into the opening 15 in the heater 14, and a threaded stud member 30 having a large head extends upwardly through the hole 15 in the heater 14 into threaded engagement with the threaded opening 28 in the heat collecting member 27. This secures the heat collecting member 27 and the heater 14 to the housing 10, and also secures the mica disc in position between the heater 14 and the shoulder 13 of the ring 11, and provides an easy means for readily detaching the heat collecting member 27 from the housing 10 for cleaning or for replacing in order to provide different size needles.

One or more needle-like members 31 are secured to the upper surface of the heat collecting member 27 and extend upwardly a considerable distance, but preferably not beyond the upper lip 32 of the housing to minimize the danger of a person sticking himself as it has been found that the needles should be quite sharp. These needle-like members 31 preferably extend down into the heat collecting plate 27 for a considerable distance and are soldered in place so that the heat conduction from the heat collecting member 27 to the needle-like members 31 is good. Thus the needles can be quickly heated almost to red-hot temperature and maintained at that elevated temperature while the piercing operation takes place. It has been found highly desirable to have one needle slightly longer than the other two needles so that the operator can position the longer needle in one of the holes in the nipple and then by rotating the nipple slightly can index the other two holes in registration with the other two needles prior to pushing the nipple and needles together.

An insulating disk 35 is connected against a peripheral shoulder 36 at the bottom of the housing 10 by means of the head on the stud 30. This serves to prevent undue heat loss through the bottom of the device which might mar a table top and it prevents accidental contact with the electrical circuit.

In operation, when a person desires to open the holes in a nipple, the heater wire 14 is energized by closing the switch which may be built into the device or by plugging the wires 22, 23 into a convenient outlet. Almost immediately the wires 16 become red hot, and radiant energy quickly heats the heat collecting member 27 and by conduction the needles 31 to a temperature sufficiently high to sterilize them. The heater device is then pushed down onto the nipple, preferably with the three holes in the nipple registered with respect to the needles 31. This quickly removes the obstruction in the holes in the nipple leaving the nipple sterile and clean.

The device is also useful to make the openings in newly purchased nipples slightly larger, as is often necessary, particularly for very young babies. For this it is desirable to have the needles 31 taper slightly. Thus the operator may regulate the size of the holes in the nipple by the extent to which he pushes the needles into them.

Figure 3:
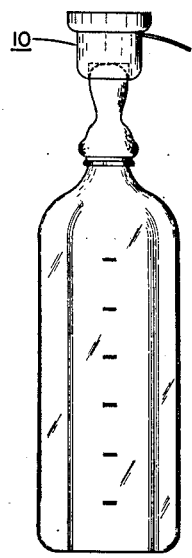
Fig. 3 is a view showing a nipple being pierced.
Figure 1:
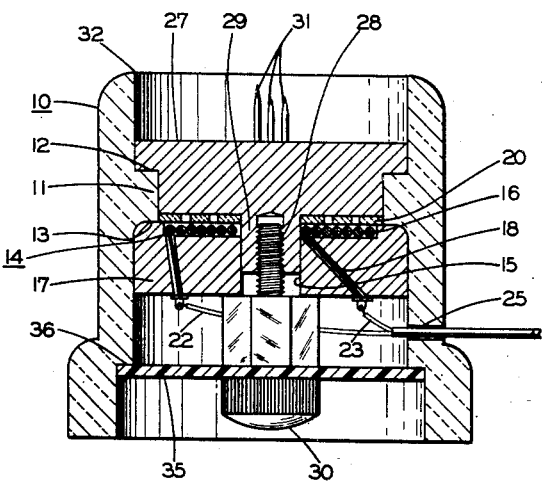

Fig. 3 shows how the raised lip 32 may serve as a guide to aid in positioning the nipple for piercing by the needles. In this embodiment the inner diameter of the housing 10 should be slightly greater than the outer diameter of the nipple. The nipple may then be rested on the lip 32 with the longer needle 31 positioned in one of the holes in the nipple. The nipple is then rotated on the lip 32 until the other holes register with the two shorter needles. The heater device is then forcibly pushed down on the nipple with each of the three needles extending into one of the three holes. The combination of the intense heat of the needle and the piercing action is highly effective in removing all obstructions. Depending upon the diameter of the needles used, the operation is also highly effective in actually making larger holes in the nipple.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A device for opening the holes in a nipple for a bottle comprising, a tubular housing having an inwardly projecting ring forming an upper and a lower shoulder, a disc-shaped electrical heating element having a central opening within said housing immediately below said lower shoulder, a disc-shaped heat collecting member having a threaded central portion within said housing immediately above said upper shoulder, a needle-like member connected to said heat collecting member and extending away therefrom, and threaded securing means extending through the opening in the heating element and in threaded engagement with said heat collecting member and said securing means having a head larger than said opening for connecting said heating element and said heat collecting member together and to said housing.

2. A device for opening the holes in a nipple for a bottle as set forth in claim 1, further characterized by the inner diameter of said tubular housing being only slightly greater than the outer diameter of the end of the nipple to be pierced by said needle-like member.

3. A device for opening the holes in a nipple for a bottle as set forth in claim 2, further characterized by a plurality of needle-like members connected to said heat collecting member, and by one of said needle-like members being longer than the remainder of said needle-like members.

HYATT P. DE GREEN.

REFERENCES CITED

The following references are of record in the file of this patent:

UNITED STATES PATENTS

| Number | Name | Date |
|---|---|---|
| 1,157,687 | Garner et al. | Oct. 26, 1915 |
| 1,474,912 | Raiche | Nov. 20, 1923 |
| 1,491,908 | Greig | Apr. 29, 1924 |
| 1,590,431 | Eseman et al. | June 29, 1926 |
| 1,855,475 | Covey | Apr. 26, 1932 |
| 1,960,776 | Flothow | May 29, 1934 |
| 2,224,941 | Weimer | Dec. 17, 1940 |